United States Patent

Asbury et al.

(10) Patent No.: US 7,490,893 B2
(45) Date of Patent: Feb. 17, 2009

(54) LAMINATED HEADLINER ASSEMBLY AND METHOD FOR FORMING A LIGHTWEIGHT LAMINATED HEADLINER

(75) Inventors: James Daniel Asbury, New Hudson, MI (US); Normand R. Marceau, Linden, MI (US); Larry F. Kocher, Canton, MI (US); Janusz P. Gorowicz, Pinckney, MI (US)

(73) Assignee: Magna International Inc., Aurora (CA)

( * ) Notice: Subject to any disclaimer, the term of this patent is extended or adjusted under 35 U.S.C. 154(b) by 472 days.

(21) Appl. No.: 10/537,332

(22) PCT Filed: Dec. 2, 2003
(Under 37 CFR 1.47)

(86) PCT No.: PCT/US03/38042
§ 371 (c)(1),
(2), (4) Date: Jun. 2, 2005

(87) PCT Pub. No.: WO2004/050429
PCT Pub. Date: Jun. 17, 2004

(65) Prior Publication Data
US 2006/0110994 A1      May 25, 2006

Related U.S. Application Data

(60) Provisional application No. 60/430,489, filed on Dec. 2, 2002.

(51) Int. Cl.
*B60J 7/00* (2006.01)
(52) U.S. Cl. .......................... 296/214; 442/35
(58) Field of Classification Search ................ 296/214, 296/39.1, 97.9
See application file for complete search history.

(56) References Cited

U.S. PATENT DOCUMENTS

| | | | |
|---|---|---|---|
| 4,798,756 A * | 1/1989 | Fukushima et al. | 428/198 |
| 5,049,439 A * | 9/1991 | Robinson | 442/225 |
| 5,089,328 A * | 2/1992 | Doerer et al. | 296/214 |
| 5,582,906 A | 12/1996 | Romesberg et al. | |
| 6,124,222 A * | 9/2000 | Gebreselassie et al. | 296/214 |
| 6,150,287 A * | 11/2000 | Boyd et al. | 296/214 |
| 6,291,370 B1 * | 9/2001 | North et al. | 442/58 |
| 6,364,976 B2 * | 4/2002 | Fletemier et al. | 156/62.2 |
| 6,436,854 B1 * | 8/2002 | North et al. | 442/58 |
| 6,756,332 B2 * | 6/2004 | Sandoe et al. | 442/344 |
| 6,793,747 B2 * | 9/2004 | North et al. | 156/62.2 |
| 6,832,810 B2 * | 12/2004 | Byma et al. | 296/214 |
| 6,878,437 B1 * | 4/2005 | Crane | 428/319.3 |

(Continued)

FOREIGN PATENT DOCUMENTS

EP    0997265 A1    5/2000

*Primary Examiner*—Kiran B. Patel
(74) *Attorney, Agent, or Firm*—Honigman Miller Schwartz and Cohn LLP

(57) ABSTRACT

A headliner assembly (10) includes a layer of core material (16), a binding agent (26) adjacent to the core material (16), a first layer of chopped fiberglass (14) adjacent to the binding agent (26), a scrim (20) adjacent to the first layer of chopped fiberglass (14), a catalyst (38) adjacent to the scrim (20), a cover stock (22) adjacent to the catalyst (38). The catalyst (38) and the binding agent (26) are mixed together and impregnate the core material when pressure is applied to the headliner assembly (10), thereby resulting in a rigid headliner assembly. A method of forming the headliner assembly (10) is also disclosed.

10 Claims, 4 Drawing Sheets

U.S. PATENT DOCUMENTS

| | | | |
|---|---|---|---|
| 6,953,205 B2* | 10/2005 | Friest et al. | 280/770 |
| 6,984,444 B2* | 1/2006 | Muhlbacher et al. | 428/292.1 |
| 7,147,716 B1* | 12/2006 | Boukobza et al. | 156/286 |
| 7,182,832 B2* | 2/2007 | Behnke et al. | 296/214 |
| 7,297,390 B2* | 11/2007 | Simmons et al. | 296/214 |
| 7,320,739 B2* | 1/2008 | Thompson et al. | 156/308.2 |
| 2001/0000162 A1* | 4/2001 | Fletemier et al. | 442/35 |
| 2001/0036788 A1* | 11/2001 | Sandoe et al. | 442/389 |
| 2002/0006755 A1* | 1/2002 | North et al. | 442/50 |
| 2003/0026968 A1* | 2/2003 | Kojima | 428/292.1 |
| 2003/0100232 A1* | 5/2003 | Kocher et al. | 442/50 |
| 2004/0097159 A1* | 5/2004 | Balthes et al. | 442/415 |
| 2004/0235376 A1* | 11/2004 | Byma et al. | 442/38 |
| 2004/0235378 A1* | 11/2004 | Byma et al. | 442/43 |
| 2005/0019546 A1* | 1/2005 | Dolgopolsky et al. | 428/304.4 |
| 2005/0136756 A1* | 6/2005 | Kocher et al. | 442/35 |

* cited by examiner

LAMINATED HEADLINER ASSEMBLY AND METHOD FOR FORMING A LIGHTWEIGHT LAMINATED HEADLINER

BACKGROUND OF THE INVENTION

1. Field of the Invention

The present invention relates to a laminated article and method for forming the laminated article. More particularly, the present invention relates to a laminated lightweight headliner assembly and method for forming the same.

2. Description of the Related Art

The headliner of a vehicle is a large lining that extends over the top of the passenger compartment to protect and aesthetically cover the vehicle roof. In some embodiments, the headliner consists of fabric that is stitched to a sheet of foam. Thus, the headliner is soft and pliable. Soft and pliable headliners are undesirable because an underlying support structure is required for the headliner to maintain its shape. Adding a support structure adds weight to the vehicle. Moreover, the support structure may create vibration noises that can be heard in the passenger compartment.

SUMMARY OF THE INVENTION

In an illustrated embodiment of the invention, a headliner assembly includes a layer of core material, a binding agent adjacent to the core material, a first layer of chopped fiberglass adjacent to the binding agent, a scrim adjacent to the first layer of chopped fiberglass, a catalyst adjacent to the scrim, and a cover stock adjacent to the catalyst. The catalyst and the binding agent are mixed together and impregnate the core material when pressure is applied to the headliner assembly, thereby resulting in a rigid headliner assembly.

A method of manufacturing the laminated headliner assembly is also disclosed. The method comprising the steps of:

applying a binding agent to one side of a core material;
applying a first layer of chopped fiberglass to said binding agent;
applying a scrim to said first layer of chopped fiberglass;
applying a catalyst to said scrim;
applying a cover stock to said catalyst; and
controlling an amount of said binding agent and said catalyst that penetrates said core material.

BRIEF DESCRIPTION OF THE DRAWINGS

The present invention will now be described, by way of example, with reference to the accompanying drawings, in which.

DETAILED DESCRIPTION OF THE INVENTION

Figure 1:
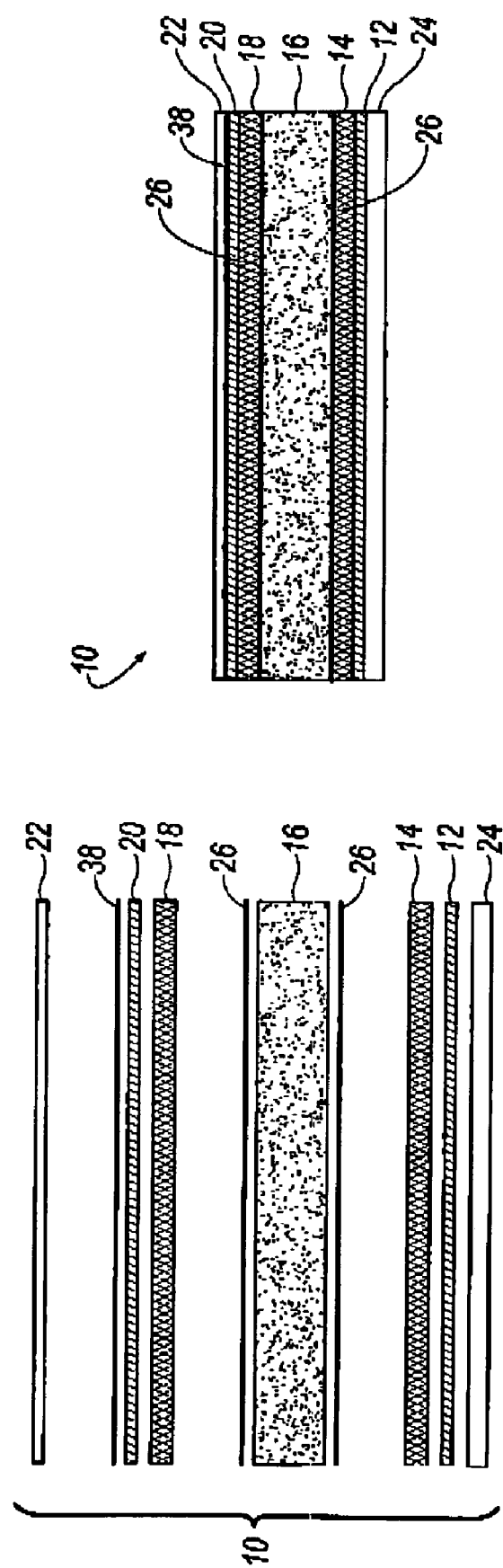
FIG. 1 is an exploded and assembled cross-sectional view of a partial laminated headliner assembly according to an embodiment of the present invention.

Referring to FIG. 1, a laminated headliner assembly 10 is generally shown according to an embodiment of the present invention. The laminated headliner assembly 10 comprises a film 12, a first layer of chopped fiberglass 14, a layer of core material, such as a layer of foam 16, a second layer of chopped fiberglass 18, a hydrophilic scrim 20 and a cover stock 22. The laminated headliner assembly 10 may also include an optional fabric covering 24 secured to the film 12 to provide an aesthetically pleasing finished surface to the laminated headliner assembly 10. The film 12 may be made of any desirable material, such as a polyester material, or the like. In addition, the film 12 may be a scrim material. The fiberglass material of the first and second layers of chopped fiberglass 14, 18 may be of natural or synthetic fibers. The layer of foam 16 is bonded to the first and second layers of chopped fiberglass 14, 18 with a binding agent 26, such as isocyanate, or the like. The layer of foam 16 may be made of any desirable material, for example, the layer of foam 16 may comprise a polyurethane, polyester material, or the like. A catalyst 38 is preferably applied to the hydrophilic scrim 20. The catalyst 38 is discussed in greater detail below.

Figure 2:
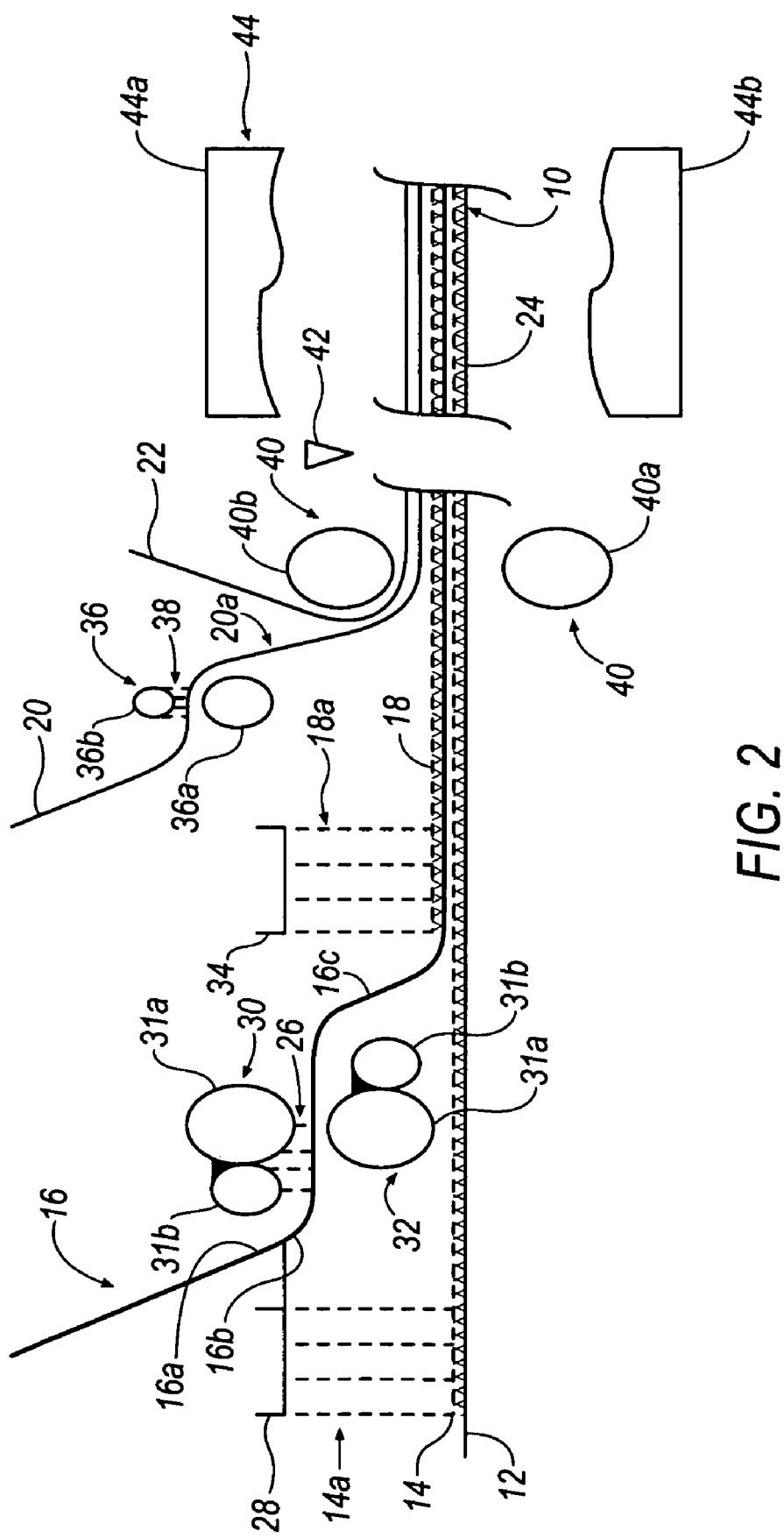
FIG. 2 is a schematic view of a method for forming the laminated headliner assembly according to an embodiment of the present invention.

FIG. 2 illustrates a method of manufacturing the laminated headliner assembly 10 according to the present invention. Initially, the first layer of chopped fiberglass 14 is applied to the film 12. As the film 12 is fed along a main assembly line, a first fiberglass chopper 28 delivers random size fiberglass 14a onto the film 12. The random size fiberglass 14a is generally evenly spread over the film 12 to form the first layer of chopped fiberglass 14.

A second assembly line feeds the layer of foam 16 through opposing sets of rollers 30, 32. Preferably, the second assembly line runs concurrently in time with the main assembly line. One set of rollers 30 rolls over a top surface 16a of the layer of foam 16 while the second set of rollers 32 rolls over a bottom surface 16b of the layer of foam 16. Each set of rollers 30, 32 includes a large roller 31a and a smaller roller 31b. The set of rollers 30, 32 are used to apply the binding agent 26 to the top and bottom surfaces 16a, 16b of the layer of foam 16. Alternatively, the binding agent 26 may be applied to only one surface of the layer of foam 16, i.e., either the top surface 16a or the bottom surface 16b.

The amount of binding agent 26 applied to layer of foam 16 is controlled by the set of rollers 30, 32. Moreover, saturation of the binding agent by the layer of foam 16 is also controlled by the set of rollers 30, 32. Specifically, the distance between large roller 31a and small roller 31b, and the position of the set of rollers 30, 32 with respect to the layer of foam 16, controls the amount of binding agent 26 applied to the layer of foam 16 and the amount of absorption of the binding agent 26 by the layer of foam 16. For instance, as the distance between large roller 31a and small roller 31b increases, the amount of binding agent 26 applied to the layer of foam 16 increases. Similarly, as the distance between set of rollers 30, 32 and the layer of foam 16 increases, the amount of binding agent 26 applied to the layer of foam 16 increases. Typically, the upper and the lower portions of the layer of foam 16 absorb the binding agent 26. Absorption of the binding agent 26 into the layer of foam 16 preferably occurs within a range of twenty percent up to eighty five percent. It should be noted that the amount of absorption may vary depending upon the final product. Finally, the rigidity of the laminated headliner assembly 10 increases with the absorption of the binding agent 26. However, the noise and vibration qualities of the headliner assembly 10 may decrease.

Once the binding agent 26 has been applied to the layer of foam 16, the agent-coated layer of foam 16c is introduced into the main assembly line. The agent-coated layer of foam 16c is placed over the first layer of chopped fiberglass 14. A second fiberglass chopper 34 delivers random size fiberglass onto the main assembly line. The random size fiberglass 18a is generally evenly spread over the agent-coated layer of foam 16c to form the second layer of chopped fiberglass 18.

The hydrophilic scrim 20 is processed in a third assembly line. The hydrophilic scrim 20 is fed through a second set of rollers 36. Second set of rollers 36 includes a large roller 36a and a small roller 36b. As the hydrophilic scrim 20 passes through the second set of rollers 36, a catalyst 38 is applied to the hydrophilic scrim 20. In one embodiment of the present invention, the catalyst 38 is approximately ninety-five percent water in composition. The remaining approximate five percent composition of the catalyst 38 is a polyol. The polyol in the catalyst 38 facilitates a reaction between the water of catalyst 38 and the binding agent 26. Thus, the catalyst 38 reduces the amount of time required for the binding agent 26 to bond the first and second layers of chopped fiberglass 14, 18 with the agent-coated layer of foam 16c. Accordingly, the catalyst 38 reduces the cycle time to manufacture the laminated headliner assembly 10.

In an alternative embodiment, the catalyst 38 includes amines. The amines interact with the binding agent 26 to facilitate a reaction having a similar effect as the polyol. It can be noted that the catalyst 38 may be any desirable composition so long as catalyst 38 reduces the cycle time to manufacture the laminated headliner assembly 10. Alternatively, the catalyst 38 may be substituted with a thermoset resin (not shown). The thermoset resin is heat activated to bond the first and second layers of chopped fiberglass 14, 18 with the agent-coated layer of foam 16c. In a further alternate embodiment, the catalyst 38 may be applied to the hydrophilic scrim 20 by soaking the hydrophilic scrim 20 in a bath 50 of the catalyst 38 as described below.

After the hydrophilic scrim 20 is fed through the second set of rollers 36, the layer of cover stock 22 is placed over the layer of hydrophilic scrim 20. The cover stock 22 is fed from a fourth assembly line (not shown). Upon joining, the cover stock 22 and the hydrophilic scrim 20 are fed to the main assembly line. A third set of rollers 40 rolls over the laminated headliner assembly 10. The third set of rollers 40 includes rollers 40a and 40b. As the laminated headliner assembly 10 is fed through the third set of rollers 40, the third set of rollers 40 ensures that the layers of the laminated headliner assembly 10 are properly bonded together. FIG. 2 illustrates rollers 40a and 40b as having approximately the same diameter. However, it can be appreciated that rollers 40a and 40b may vary in diameter with respect to each other.

Additionally, the optional fabric covering 24 may be placed upon the film 12. The addition of the fabric covering 24 is known by those skilled in the art and may be applied to the laminated headliner assembly 10 by any conventional means.

After the laminated headliner assembly 10 passes through the third set of rollers 40, the laminated headliner assembly 10 is cut to a desired length by a cutter 42. The laminated headliner assembly 10 may be cut to any desired length. The length generally depends upon which vehicle the laminated headliner assembly 10 will be installed. Finally, the laminated headliner assembly 10 undergoes a process that presses together the layers of the laminated headliner assembly 10. As shown in FIG. 2, a press 44 applies pressure to the laminated headliner assembly 10. The press 44 includes, for example, an upper mold half 44a and a lower mold half 44b. The force exerted by upper and lower mold halves 44a, 44b onto the laminated headliner assembly 10 assists in bonding together the film 12, the first layer of chopped fiberglass 14, the agent-based layer of foam 16c, the second layer of chopped fiberglass 18, the hydrophilic scrim 20, the cover stock 22 and the optional fabric covering 24 of the laminated headliner assembly 10. More specifically, the force exerted by upper and lower mold halves 44a, 44b mixes catalyst 38 with binding agent 26. Primarily, the water component of catalyst 38 mixes with binding agent 26. The mixture of the catalyst 38 and binding agent 26 diffuses through various layers of the laminated headliner assembly 10 and impregnates a portion of the layer of foam 16, resulting in a rigid laminated headliner assembly 10.

Figure 3:
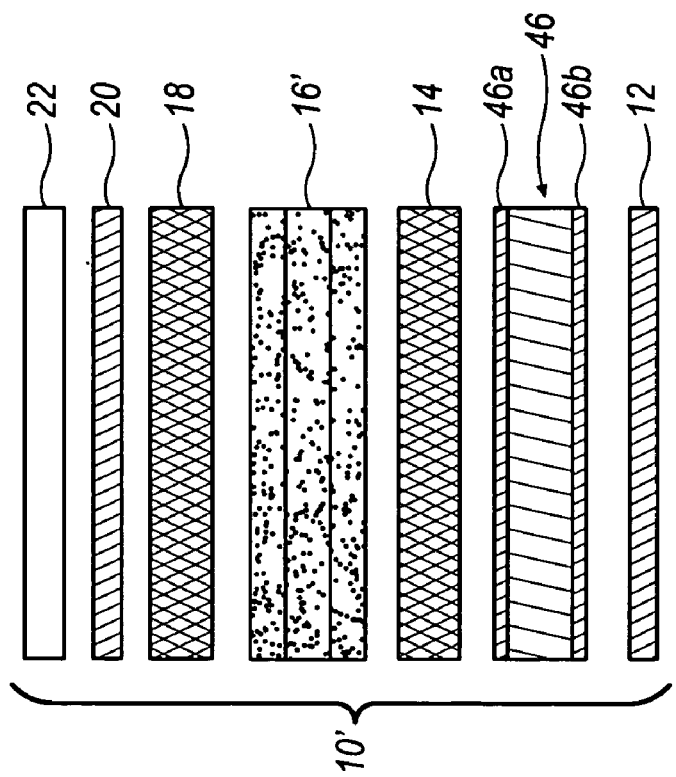
FIG. 3 is an exploded cross-sectional view of a laminated headliner assembly according to an alternate embodiment of the present invention.

Referring to FIG. 3, an alternative embodiment of the laminated headliner assembly 10' is shown according to the present invention. Laminated headliner assembly 10' incorporates substantially all of the features present in laminated headliner assembly 10. Specifically, laminated headliner assembly 10' includes a layer of polyurethane foam 16' in which the binding agent 26 is partially absorbed. The laminated headliner assembly 10' further includes an adhesive film or web 46 applied between the layer of film 12 and the first layer of chopped fiberglass 14. The adhesive web 46 may be an interchangeable multi-layer adhesive that is tacky on one or both sides, indicated at 46a and 46b.

Figure 4:
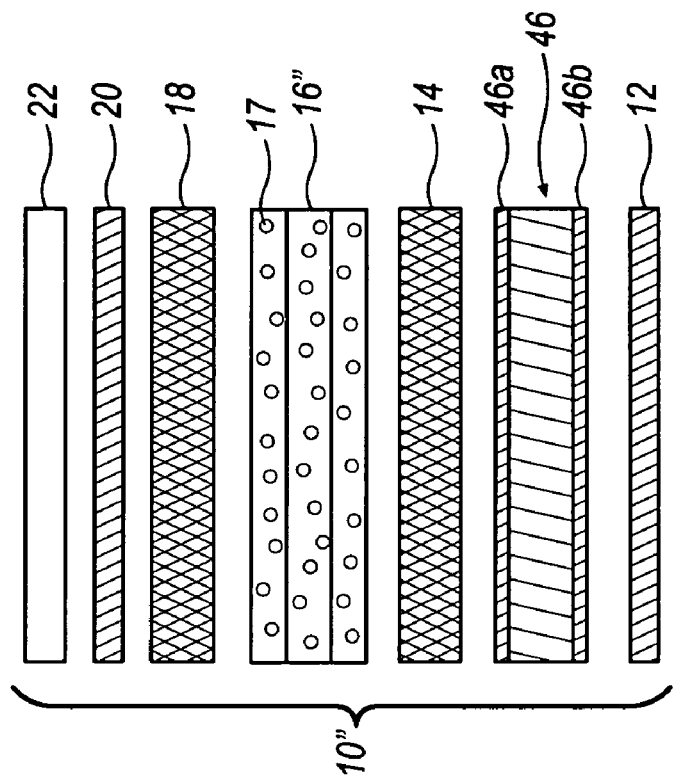
FIG. 4 is an exploded cross-sectional view of a laminated headliner assembly according to another alternate embodiment of the present invention.

FIG. 4 is a further alternative embodiment of the laminated headliner assembly 10" according to the present invention. The laminated headliner assembly 10" is similar to and substantially incorporates the features of laminated headliner assembly 10 and laminated headliner assembly 10'. However, laminated headliner assembly 10" includes a different core material, for example, a polyester batting 16" in place of the layer of foam 16. Moreover, the binding agent 26 is partially absorbed within the polyester batting 16". The polyester batting 16" may include various sized fibers 17 that blend with binding agent 26.

Figure 5:
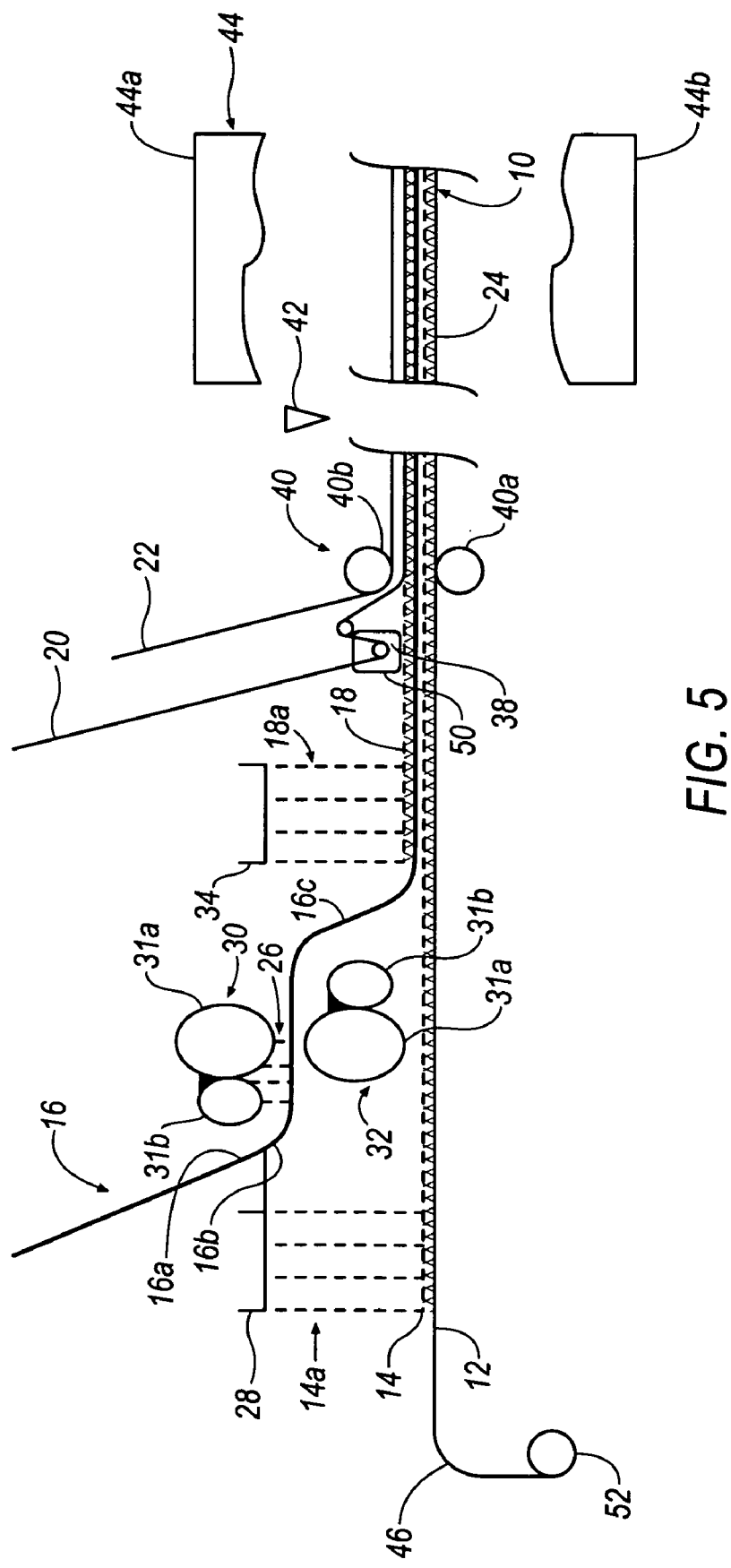
FIG. 5 is a schematic view of an alternate method for forming a laminated headliner assembly according to an embodiment of the present invention.

FIG. 5 illustrates a method of manufacturing laminated headliner assembly 10' and 10" of FIGS. 3 and 4. The method of manufacturing laminated headliner assembly 10' and 10" is similar to and substantially incorporates the method of manufacturing laminated headliner assembly 10 as illustrated in FIG. 2. However, the method of manufacturing laminated headliner assembly 10' and 10" includes an initial step of feeding the adhesive film 46 from a roller 52 into the main assembly line. The adhesive film 46 is placed over the layer of film 12'. Additionally, the hydrophilic film 20 enters a holding bin or bath 50 where catalyst 38 is applied.

The method of manufacturing the laminated headliner assembly 10 according to the present invention results in advantages over conventional headliner assemblies. First, conventional headliner assemblies require the use of a thermoset resin to bind together the various layers of the headliner assembly. As a result, conventional headliner assemblies must be heated in order for the resin to properly bind the layers of the headliner assembly. Additionally, conventional headliner assemblies require an additional step of pre-mixing the thermoset resin and the catalyst together before applying the mixture to the headliner assembly. Further, conventional headliner assemblies require additional adhesive layers between each layer of fiberglass and the outermost layers of the headliner assembly.

In contrast, the laminated headliner assembly of the present invention does not require the use of a thermoset resin. Thus, the laminated headliner assembly 10 does not have to be heated. Moreover, the binding agent 26 and the catalyst 38 do not have to be pre-mixed before application. Finally, the laminated headliner assembly 10 of the present invention does not require additional adhesive layers to bind the first and second layers of fiberglass 14, 18 or to bind the outermost layers of the laminated headliner assembly 10. According, the laminated headliner assembly 10 of the present invention eliminates several steps in the conventional manufacturing process, resulting in a headliner assembly that is less expensive and easier to manufacture than conventional headliner assemblies. It should be noted that while the present invention is directed towards a headliner assembly, the present invention may be applied to various components within the vehicle, including, for example, a door trim, or a luggage trim, or the like.

While the invention has been specifically described in connection with certain specific embodiments thereof, it is to be understood that this is by way of illustration and not of limitation, and the scope of the appended claims should be construed as broadly as the prior art will permit.

What is claimed is:

1. A headliner assembly comprising:
   a layer of core material including a first side and a second side;
   a first binding agent layer including a first side and a second side, wherein the second side of the binding agent layer is arranged adjacent to the first side of said core material;
   a first layer of chopped fiberglass including a first side and a second side, wherein the second side of the first layer of chopped fiberglass is arranged adjacent to the first side of said binding agent layer;
   a scrim including a first side and a second side, wherein the second side of the scrim is arranged adjacent to the first side of said first layer of chopped fiberglass;
   a catalyst layer including a first side and a second side, wherein the second side of the catalyst layer is arranged adjacent to the first side of said scrim; and
   a cover stock including a first side and a second side, wherein the second side of the cover stock is arranged adjacent to the first side of said catalyst layer.

2. A headliner assembly as recited in claim 1, further including
   a second binding agent layer including a first side and a second side, wherein the first side of the second binding agent layer is arranged adjacent to the second side of said core material;
   a second layer of chopped fiberglass including a first side and a second side, wherein the first side of the second layer of chopped fiberglass is arranged adjacent to the second side of said second binding agent layer, and
   a layer of film including a first side and a second side, wherein the first side of the layer of film is arranged adjacent to the second side of said second layer of chopped fiberglass.

3. The headliner assembly as recited in claim 1 further comprising
   means for forming the headliner assembly including
      the second side of the first binding agent layer applied adjacent to the first side of the core material,
      the second side of the first layer of chopped fiberglass applied adjacent to the first side of said first binding agent layer,
      the second side of the scrim applied adjacent to the first side of said first layer of chopped fiberglass,
      the second side of the catalyst layer applied adjacent to the first side of said scrim, and
      the second side of the cover stock applied adjacent to the first side of said catalyst layer, whereby said catalyst layer and said binding agent layer are mixed together and impregnate said core material when pressure is applied to the headliner assembly, thereby resulting in a rigid headliner assembly.

4. The headliner assembly as recited in claim 3 further comprising
   a second binding agent layer including a first side and a second side,
   a second layer of chopped fiberglass including a first side and a second side; and
   a layer of film including a first side and a second side, wherein the means for forming the headliner further includes
      the first side of said second binding agent layer applied to the second side of said core material,
      the first side of said second layer of chopped fiberglass applied to the second side of said second binding agent layer, and
      the first side of said layer of film applied to the second side of said second layer of chopped fiberglass.

5. The headliner assembly as recited in claim 4 further comprising
   a fabric covering including a first side and a second side, wherein the means for forming the headliner further includes
      the first side of said fabric covering applied to the second side of said layer of film.

6. The headliner assembly as recited in claim 1, wherein said catalyst and said binding agent are mixed together and impregnate said core material when pressure is applied to the headliner assembly, thereby resulting in a rigid headliner assembly.

7. The headliner assembly as recited in claim 6, wherein said catalyst includes
   water, and
   polyol.

8. The headliner assembly as recited in claim 7, wherein said catalyst includes approximately 95% water and 5% polyol.

9. The headliner assembly as recited in claim 7, wherein the polyol includes
   means for reducing an amount of time for the binding agent to band with the first layer of chopped fiberglass and the layer of core material by facilitating a reaction between the water of the catalyst and the binding agent.

10. The headliner assembly as recited in claim 2 further comprising
    a fabric covering including a first side and a second side, wherein the first side of the fabric covering is arranged adjacent to the second side of said layer of film.

* * * * *